Patented Mar. 17, 1942

2,276,874

UNITED STATES PATENT OFFICE 2,276,874

ACID AND ALKALI RESISTANT CELLULOSE ESTER COATING COMPOSITION

Harold C. Reynolds, Jr., Roselle Park, and Henry B. Kellog, Union City, N. J., assignors to Standard Oil Development Company, a corporation of Delaware No Drawing. Application October 19, 1938, Serial No. 235,776

6 Claims. (Cl. 260—17)

This invention relates to acid- and alkali-resistant cellulose derivative coating compositions, particularly to such lacquer compositions containing halogenated hydrocarbon polymers, such as chlorinated isobutylene polymers.

Previous attempts to incorporate chlorinated isobutylene polymers which have desirable properties with cellulose ester or cellulose ether compositions have always led to an undesirable murky film.

An object of this invention is to provide a composition which will form clear films which will have a high resistance to acids and alkalies. A still further object is the provision of a surface coating composition imparting a finish coat which is tough, durable, flexible, quick-drying and somewhat fireproof.

These and other objects are accomplished by the present invention which comprises broadly incorporating with the halogenated hydrocarbon polymers and cellulose ester or cellulose ether a plasticizer and/or resin in which both the halogenated polymers and cellulose ester or ether are soluble. For example, plasticizers such as tricresyl phosphate, dibutyl phthalate, triphenyl phosphate, methyl phthalyl ethyl glycollate, camphor, methyl cyclohexyl adipate, triacetin, benzyl benzoate and resins such as hydrogenated abietic acid esters are very suitable non-volatile solvents for chlorinated isobutylene polymers and these compounds are also excellent non-volatile solvents for cellulose esters and ethers, such as nitrocellulose, benzyl cellulose and ethyl cellulose.

However, the combination of cellulose esters or cellulose ethers, halogenated polymers, and solvent plasticizers and/or resins is not usually used as such alone, but in order to reduce the viscosity of the mixture for brushing and spraying, a combination of volatile solvents and non-solvents is added thereto.

According to the present invention this combination of solvents and non-solvents is so made as to contain only such esters, alcohols, ketones, and hydrocarbons which are capable of being evaporated at room temperature or in a drying oven and which do not preferentially precipitate out any non-volatile components before another. As esters which are solvents for all three solid components and which may be used are for example: ethyl acetate, butyl acetate, and butyl propionate. Among the alcohols, which are solvents only in the presence of the esters or ketones, ethyl, isopropyl, secondary butyl and amyl alcohols and the like are desirable. Among the ketones, acetone, methyl ethyl ketone and cyclohexanone were found to be suitable. Additional organic compounds containing one carbonyl group per molecule and having more than 3 carbon atoms such as amyl acetate, tributyl phosphate, esters of wax acids, methyl propyl ketone, isopropyl acetate, cyclohexanone and butyl sulfone may also be used as solvents for the chlorinated isobutylene polymers. As non-solvents, benzol, toluol and xylol, as well as petroleum naphthas and aromatic hydrocarbons obtained by $SO_2$ extraction of petroleum or cracked naphthas may be added in limited quantity to impart lower viscosity.

The halogenated hydrocarbon polymers to be used are obtained by halogenation, preferably by chlorination, of polymers derived from various hydrocarbon compounds which are capable of polymerizing or co-polymerizing to produce an aliphatic compound having a high molecular weight e. g. above 1,000, preferably above 5,000 or 10,000, and perhaps as high as 250,000 or higher, as determined by the viscosity method described in Staudinger's book, "Die Hochmolekularen Organischem Verbindungen," H. Staudinger Berlin, 1932, Verlag Von Julius Stringer, page 56. As raw material for this polymerization, it is preferred to use olefines, especially iso-olefines such as isobutylene, or other iso-olefines such as 2-methyl butene-1 having a similar structure. These olefines polymerize in the presence of an active halide catalyst, such as boron fluoride, aluminum chloride, etc. at temperatures below —20° C., preferably —50° C. or —80° C., to high molecular weight, substantially linear, saturated aliphatic hydrocarbon polymers having an iodine number below 10 and generally below 5, and perhaps even as low or lower than 1. Such polymers are in themselves very resistant to oxidation and attack by acids and alkalies, but they have the disadvantage that they are not compatible with cellulose esters and certain resins and other materials commonly used in coating compositions. However, when halogenated, for example, to a chlorine content of at least 10%, the compatibility with cellulose esters is sufficiently improved, that when used with a mutual solvent such as herein described, a homogeneous coating composition can be made which will remain clear after evaporation of the volatile solvent.

Chlorinated hydrogenated rubber, although not as satisfactory as chlorinated polymerized iso-olefines may likewise be employed for the purposes of this invention.

It is preferred to chlorinate to a chlorine content of 30–60%, and preferably between 30% and 50%, because the compatibility improves considerably when the chlorine content is increased from 10% to 30%, but above 50% or 60% this characteristic does not materially change, and since it is substantially more difficult to add chlorine above 55 or 60% than it is to add a similar amount of chlorine during the lower stages of chlorination, it is not economical for purposes of the present invention to chlorinate substantially beyond 60%.

Chlorinated copolymers prepared by reacting a low molecular weight olefine, preferably an iso-olefine, such as isobutylene, with low molecular weight diolefine, preferably a conjugated diolefine, such as butadiene, at relatively low temperatures, namely, below 0° C. and preferably below −50° C. in the presence of suitable catalyst and subsequently chlorinated to a $Cl_2$ content of about 15 to 50% may also be used instead of chlorinated isobutylene polymers. Chlorinated copolymers obtained by polymerizing diolefines such as butadiene at elevated temperature or in the presence of a polymerization catalyst at ordinary temperature in a mixture with ethylene hydrocarbons and acetaldehyde may also be used in place of chlorinated isobutylene polymers. Likewise, one can use chlorinated co-polymers obtained by polymerization of iso-olefines with di-olefines in the presence or absence of metallic halide catalysts or other suitable catalysts at temperatures below 0° C. and high pressures, or at temperatures above 0° C. and high pressures. As still further alternatives, beta unsaturated iso-olefines having a mol. wt. of 1,000 and chlorinated to the extent of 5–40% may likewise be used, and solid polymers of ethylene prepared by subjecting ethylene compressed to at least 500–3,000 atmospheres and temperatures of 100°–400° C. in the presence of a small amount of oxygen not exceeding 3% may be chlorinated to the extent of 30% and effectively utilized instead of the chlorinated isobutylene polymers, although the latter are superior and are preferred.

Although the various co-polymers mentioned above may not be quite as satisfactory as polyisobutylene because they are not substantially completely saturated, they are useful in that they have an iodine number of 20–50 and hence are not nearly as unsaturated as rubber or various synthetic products made by simple polymerization of diolefines, which have an iodine number of 300–375. As will be pointed out more specifically later, chlorinated rubber does not give satisfactory results for the purposes of the present invention and, consequently, is not at all an equivalent of the chlorinated polymers and co-polymers of the present invention.

Obviously, the chlorinated isobutylene polymers can be employed further in combination with other non-solvent hardening agents and resins as are usually used in lacquers. Pigments, fillers and dyes may be mixed with the non-volatile solvent pasticizer and/or resin and then kneaded and/or mixed with the chlorinated isobutylene polymer and moistened cellulose ester or ether until the pigment is uniformly distributed in the plastic mass.

The new improved surface coating composition does not possess the disadvantages inherent in the hitherto employed lacquer preparations, which deteriorate rapidly and loose their adhesiveness to the surface to which they are applied when in contact with alkaline material such as caustic, cement or lime bearing water, or with acid materials such as mineral acids, or liquid organic acids, whereas the lacquer compositions of the present invention containing halogenated isobutylene polymers are very resistant to the deteriorating effects of chemical compounds.

The invention is susceptible to considerable variation and modification in the manner of its practical application, as will be apparent to those skilled in the art. For instance, in addition to the cellulose esters and ethers already mentioned including ethyl cellulose, other alkyl celluloses may be used, such as the corresponding methyl, propyl, isopropyl, butyl, etc., derivatives of cellulose as well as cellulose naphthenate, and various other solvents may be used than those mentioned.

As to cellulose esters, it has been found that the esters of lower aliphatic acids, e. g., cellulose acetate, are not as compatible in the desired mixtures as are the esters of higher aliphatic acids, e. g., cellulose trilaurate, palmitate, and similar esters of aliphatic acids having more than two carbon atoms.

It is understood of course that the proportions of the various constituents of the solvent mixture may be varied as is well known in the art according to the particular type of cellulose derivative being used, the desired speed of drying and various other factors; for instance, it is well known that nitrocellulose requires a solvent containing a higher percentage of oxygen-containing compounds than does ethyl cellulose.

As to the relative proportions of the 3 primary non-volatile constituents, i. e. the cellulose ester or ether, the halogenated polymer and the mutual solvent (which may be either plasticizer or resin), it is difficult to fix exact proportions which will fit all types of materials and consequently it is best to say that the amount of halogenated polymer should be sufficient to impart to the cellulose ester or ether film the desired resistance to acid and alkali as well as resistance to weathering, etc., and the amount of mutual solvent should be sufficient to maintain the halogenated polymer in true solution in the cellulose ester or ether after evaporation of the volatile solvents used in depositing a thin film. The proportions of these materials will also depend, to some extent, upon the type of halogenated polymer, i. e. upon the molecular weight of the iso-olefine polymer used as raw material for the halogenation, and also on the degree and conditions of halogenation. For instance, it is preferable to start with an isobutylene polymer having a molecular weight above about 50,000 and to chlorinate this polymer in the presence of direct sunlight or other catalyzing sources of light, such as ultraviolet light, and preferably at low temperature, e. g. below 70° C., so as to effect a rapid chlorination with relatively little breakdown in the molecular weight of the original polymer.

When the cellulose ester used is nitrocellulose, it is best to use an amount of plasticizer eugal to at least 30% of the weight of the total non-volatile constituents or an amount of plasticizer not substantially less than the amount of halogenated polymer. When the cellulose ether used is an alkyl cellulose such as ethyl cellulose, the amount of plasticizer should generally be somewhat more, for instance, at least about 35% of the weight of total non-volatile constituents and when the cellulose ether used is an aralkyl derivative such as benzyl cellulose, the amount of plasticizer can be substantially reduced to, for instance, 20% or so of the total amount of non-volatile constituents.

The following examples will illustrate how the invention may be executed. The approximate proportions and concentrations are given by weight.

Example 1

6 parts wet ½ sec. R. S.* nitrocellulose
6 parts 50% chlorinated isobutylene polymer
6 parts tricresyl phosphate with a solvent consisting of—
   10 parts ethyl acetate
   8 parts butyl acetate
   5 parts butyl alcohol
   26 parts toluol
   4 parts SO₂ extract of crude petroleum boiling between 200°–275° F.

*Regular soluble.

Example 2

6 parts of high viscosity ethyl cellulose
4.8 parts of 50% chlorinated isobutylene polymer
6 parts tricresyl phosphate with a solvent consisting of—
   10 parts ethyl acetate
   8 parts butyl acetate
   5 parts butyl alcohol
   150 parts toluol
   4 parts SO₂ extract of crude petroleum boiling between 200°–275° F.

Example 3

6 parts benzyl cellulose
6 parts 50% chlorinated isobutylene polymer
3 parts benzyl benzoate with a solvent consisting of—
   20 parts ethyl alcohol
   80 parts toluol
   4 parts SO₂ extract of crude petroleum boiling between 200°–275° F.

The coating compositions described in the above three examples all gave a satisfactory, clear, hard film on evaporation of the solvent. In those coating compositions, the chlorinated isobutylene polymer was prepared from a 70,000 molecular weight polyisobutylene by chlorination in a continuous process, using cold radiation from a mercury arc to stimulate the chlorination.

As an example of the fortifying effect of halogenated isobutylene polymers, metal panels coated with nitrocellulose lacquers containing hydrogenated abietic acid ester ("Hercolyn") with and without halogenated isobutylene polymer (the same polymer as was used in the above Examples 1, 2, and 3) and a similar panel without any nitrocellulose were immersed in a 10% (by weight) solution of hydrochloric acid and similar panels immersed in a 40% (by weight) solution of sodium hydroxide, and similar panels were tested in a standard weatherometer. The results of these tests are reported in the following table:

Table I

| | Panel, Test No. — | | |
|---|---|---|---|
| | 1 | 2 | 3 |
| | Nitrocellulose+ester resin* | Nitrocellulose+ester resin*+chlorinated polymer | Ester resin*+chlorinated polymer |
| Standard weatherometer: | | | |
| 8 cycles** | Cracks—brown | O. K.—brown | Rough—brown. |
| 21 cycles | Cracks underneath—brown. | Failed by cracking | Failed completely. |
| Chemical tests: | | | |
| 10% hydrochloric acid (6 wks.) | Lifted off panel | O. K | Lost adhesion—fair. |
| 40% sodium hydroxide | Chewed up (20 hrs.) | After 20 hrs. film and underneath metal intact but film lost slight adhesion. | Discolored—no adhesion. |

*Hydrogenated abietic acid ester ("Hercolyn").
**The cycle used in the artificial weathering machine (weatherometer) consists of the following artificial weather conditions every 24 hrs. which is taken as a cycle:

| | Hours |
|---|---|
| Rain | 1 |
| Light | 2 |
| Rain | 2 |
| Light | 18 |
| Blank | 1 |
| Total | 24 |

As shown in the above table, after a period of 6 weeks immersion in the 10% hydrochloric acid solution the lacquered film not containing halogenated isobutylene polymers lifted completely off the metal panel, while the laquered film containing cellulose ester and halogenated isobutylene polymer was unchanged and still protected the under surface. After 20 hours immersion in the 40% sodium hydroxide solution the panel coated with the cellulose lacquer film not containing halogenated isobutylene polymer was completely disintegrated by the action of the strong alkali, whereas the coated panel containing cellulose lacquer film and halogenated isobutylene polymer was unchanged.

The compositions made according to the present invention may be applied to various uses such as surface coatings, as for example, coating electric cables with several layers of the composition or electric cables previously coated with rubber, fabric or any other suitable insulating material, thus rendering the outer surface of the cable waterproof, acid- and alkali-resistant. This composition or lacquer, if applied to wood and interior walls, renders them moistureproof and resistant to the attack of caustics or acids, particularly in chemical laboratories.

As many apparent and widely different embodiments of this invention may be made without departing from the spirit thereof, it is not intended to be limited to the foregoing examples or description, but only by the appended claims in which the invention is intended to be claimed as broadly as the prior art permits.

We claim:

1. A hard, tough, flexible, acid- and alkali-resistant coating composition comprising a cellulose derivative selected from the class consisting of cellulose esters and cellulose ethers, a halogen derivative of a substantially saturated aliphatic hydrocarbon polymer having a molecular weight above 1,000 and an iodine number below about 50, containing at least 10% of halogen, a non-volatile mutual solvent for said cellulose derivative and polymer comprising a high-boiling ester, and a volatile solvent, said non-volatile solvent being present in an amount sufficient to maintain the residual non-volatile constituents in clear condition upon evaporation of the volatile solvent.

2. A coating composition comprising a cellulose derivative selected from the group consisting of cellulose esters and cellulose ethers, a chlorine derivative of a substantially saturated aliphatic hydrocarbon polymer having a molecular weight above 5,000 and an iodine number below about 10, containing at least 30% chlorine, a non-volatile mutual solvent for said cellulose derivative and polymer comprising a high-boiling ester, and a volatile solvent, said non-volatile solvent being present in an amount of about 10 to 50% of the weight of the total non-volatile constituents.

3. A coating composition according to claim 2 in which the chlorine derivative of a substantially saturated aliphatic hydrocarbon polymer is a chlorine derivative of a polymerized aliphatic iso-olefine.

4. Composition according to claim 2 in which the chlorinated polymer is chlorinated polyisobutylene and in which this chlorinated polymer is present in an amount of 20 to 40% of the weight of the total non-volatile constituents and in which the cellulose derivative is nitrocellulose.

5. Composition according to claim 2 in which the chlorinated polymer is chlorinated polyisobutylene and in which this chlorinated polymer is present in an amount of 20 to 40% of the weight of the total non-volatile constituents and in which the cellulose derivative is ethyl cellulose.

6. An acid- and alkali-resistant cellulose derivative coating comprising a cellulose ether, a chlorinated isobutylene polymer having a molecular weight above 1,000, and a plasticizer.

HAROLD C. REYNOLDS, Jr.
HENRY B. KELLOG.